Figure 1:
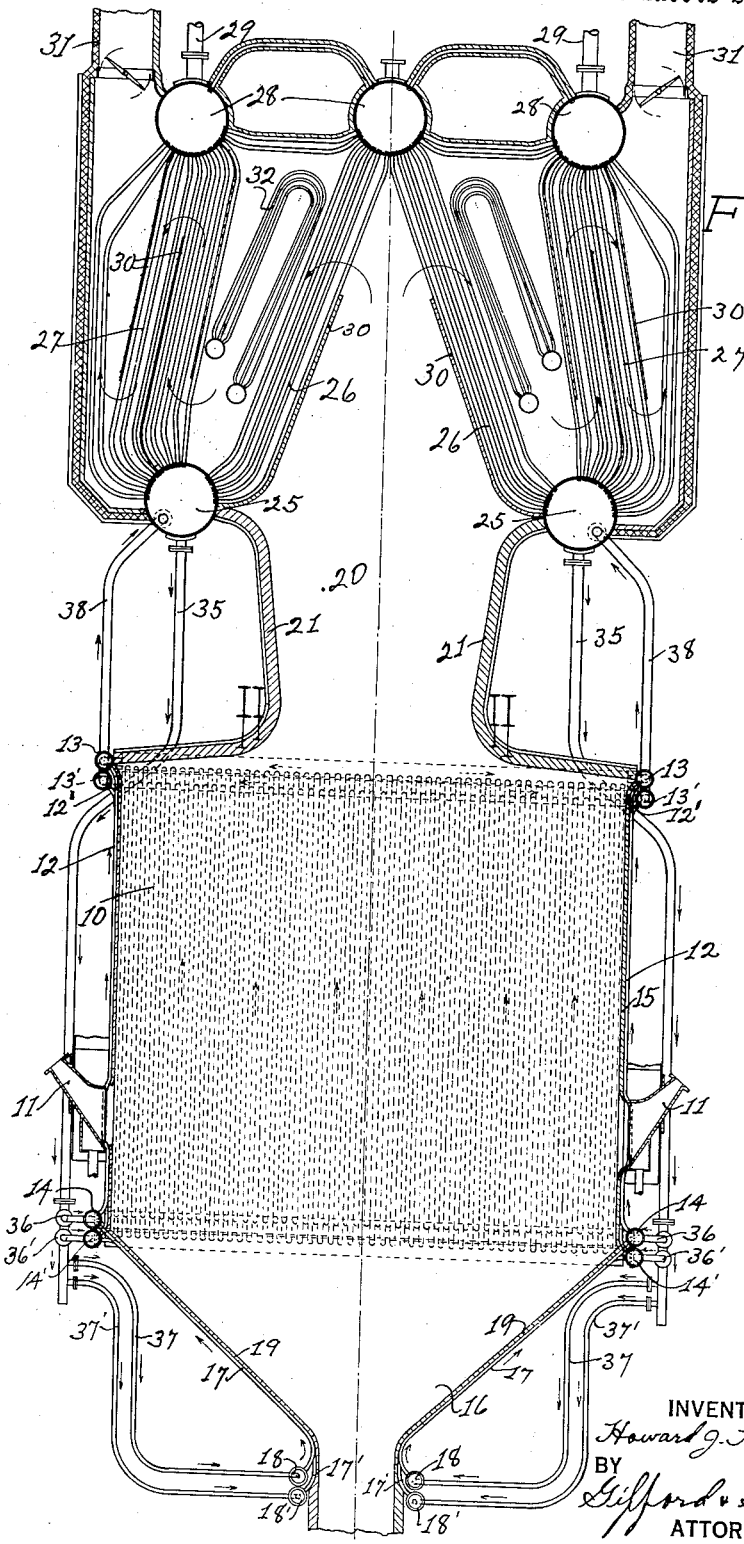

Dec. 27, 1932.　　　　　H. J. KERR　　　　　1,892,662
POWDERED FUEL FURNACE
Filed April 7, 1927　　　3 Sheets-Sheet 1

INVENTOR
Howard J. Kerr
BY
Gifford & Scull
ATTORNEYS

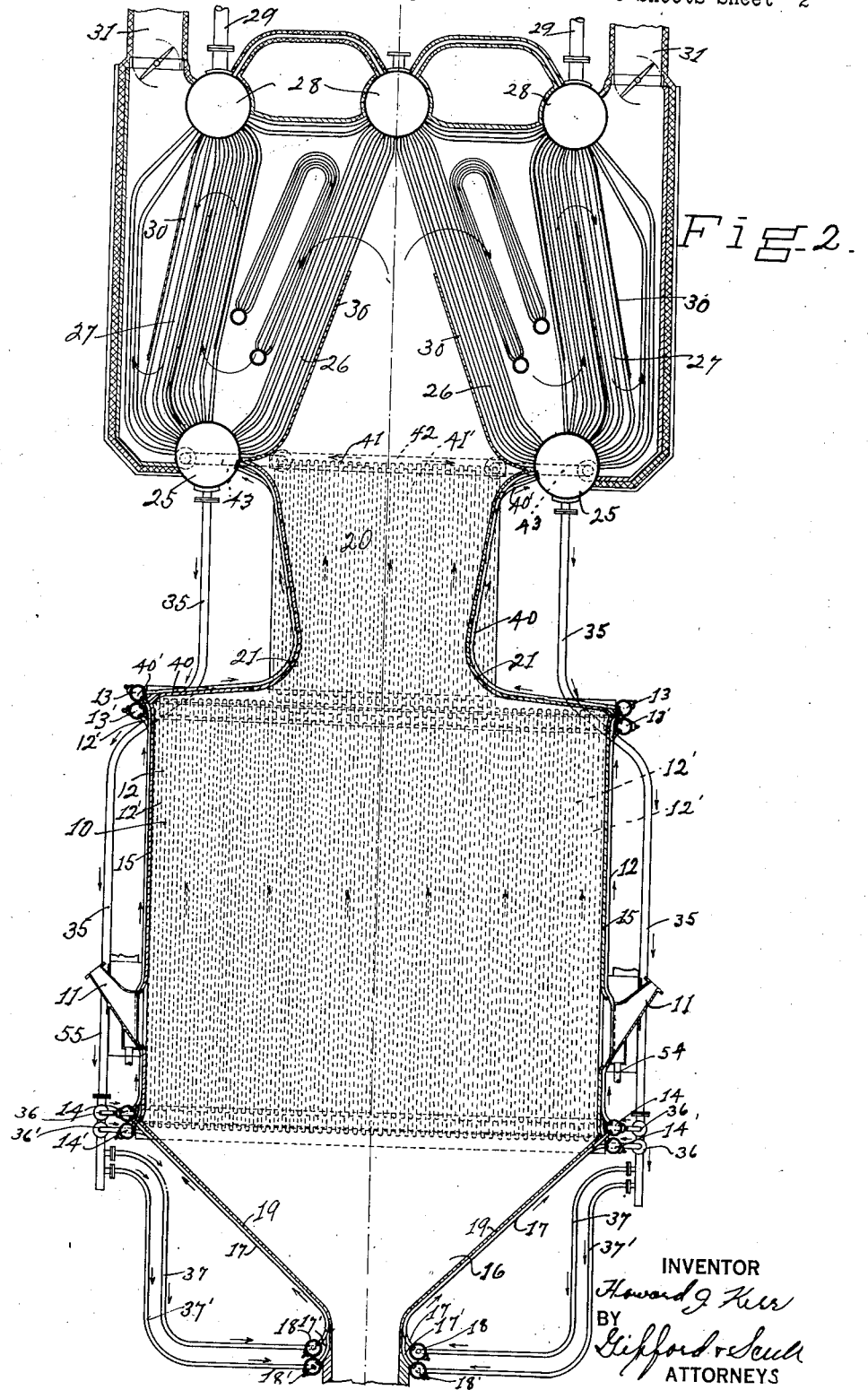

Dec. 27, 1932.  H. J. KERR  1,892,662
POWDERED FUEL FURNACE
Filed April 7, 1927   3 Sheets-Sheet 3
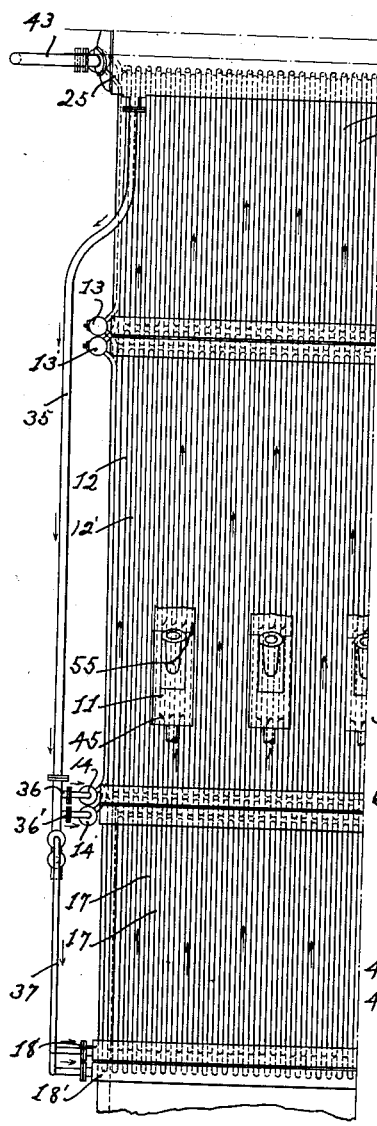
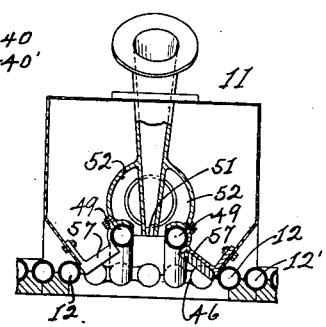
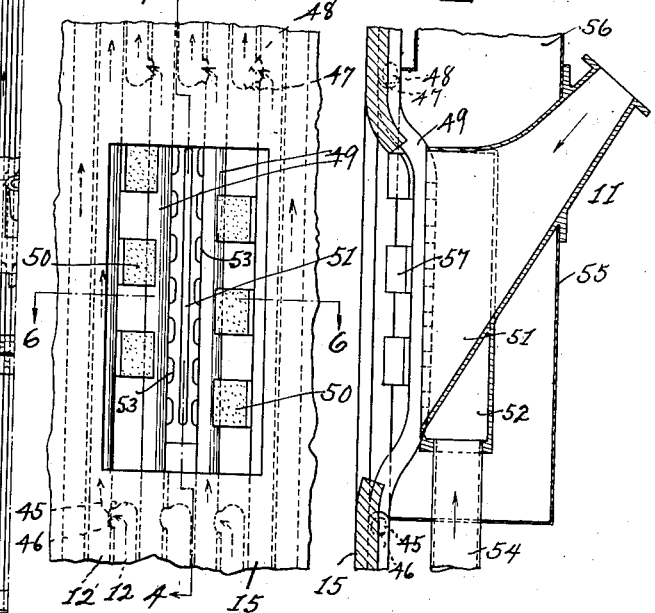
INVENTOR
Howard J. Kerr
BY
Gifford & Scull
ATTORNEYS Patented Dec. 27, 1932

1,892,662

UNITED STATES PATENT OFFICE

HOWARD J. KERR, OF WESTFIELD, NEW JERSEY, ASSIGNOR, BY MESNE ASSIGNMENTS, TO FULLER LEHIGH COMPANY, A CORPORATION OF DELAWARE

POWDERED FUEL FURNACE

Application filed April 7, 1927. Serial No. 181,710.

This invention relates to a furnace that is suitable, for example, for a steam boiler, and will be understood from the description in connection with the accompanying drawings in which Fig. 1 is a vertical section through an illustrative embodiment of the invention; Fig. 2 is a similar section through a modification; Fig. 3 is a side view of Fig. 2 on an enlarged scale partly broken away; Fig. 4 is a section along the line 4—4 of Fig. 5; Fig. 5 is a view on an enlarged scale from the inside of the furnace, and Fig. 6 is a section along the line 6—6 of Fig. 5.

In the drawings, reference character 10 indicates a furnace that constitutes a primary combustion chamber or space to which fuel burners 11, such as those suitable for powdered coal, for example, lead. The furnace walls are provided with parallel tubes 12 and 12', the upper ends of which extend into headers 13 and 13' that may extend entirely around the upper portion of the primary combustion chamber. The lower ends of the tubes 12 and 12' extend into headers 14 and 14' that are similar to the headers 13 and 13', and may extend entirely around the lower portion of the combustion chamber. The headers 13 and 13', and also the headers 14 and 14', are located one above the other, so that the ends of the tubes 12 and 12' can be expanded into the headers with the tubes lying very close together along the walls of the furnace. The tubes 12 and 12' are placed close together as the two headers at the top and bottom, respectively, permit this to be done without destroying the ligament strength of the headers. Thus alternate tubes of the furnace wall enter different headers so that closer spacing of tubes can be provided with the same ligament strength in the headers, or the same spacing of tubes as that usually employed can be used with even more ligament strength in the headers, or results intermediate these two can be secured. The tubes 12 and 12' may be lined with tile 15 on the furnace side.

A hopper-shaped ash pit 16 is located at the lower end of the furnace, and inclined tubes 17 and 17' extend along the side walls of this ash pit from the headers 14 and 14' to headers 18 and 18' and are lined on the furnace side with tile 19.

A secondary combustion space or chamber 20 is located above the primary combustion space 10 and is of smaller cross section due to the fact that the side walls 21 are brought closer together, as they extend inwardly from the headers 13, and thence upwardly, flaring slightly outwardly to the mud drums 25 of the boilers. In the illustrative embodiment of the invention a type of Stirling boiler is shown mounted above the secondary combustion chamber 20, but it is to be understood that boilers of other types may be so mounted so that the gases from the combustion chamber 20 generate steam therein. The boiler comprises lower mud drums 25 connected by banks of tubes 26 and 27 to upper drums 28, from which steam connections 29 may lead to superheaters 32. The boiler is provided with the usual baffles 30 and waste gas outlets 31.

Tubes 35 lead downwardly from the lower portions of the drums 25 and branches 36 and 36' therefrom lead to the headers 14 and 14', while branches 37 and 37' lead to the headers 18 and 18'. Tubes 38 lead from the headers 13 and 13' to the drums 25.

The operation is as follows: Powdered coal, for example, is introduced through the fuel burners 11 and undergoes partial combustion in the chamber 10, while the ash is discharged through the ash pit 16. Combustion is completed in the chamber 20 and the hot products of combustion pass over the boiler tubes and generate steam therein. Feed water may be introduced into the boiler at any convenient place. Water passes downwardly from the drums 25 through the pipes 35 into the headers 14, 14', 18 and 18'. The water entering the headers 18 and 18' passes upwardly through the inclined tubes 17 and 17' along the sides of the ash pit 16 into the headers 14 and 14', from which it passes upwardly through the furnace wall tubes 12 and 12', where it is heated, into headers 13 and 13', and the mixture of steam and water then passes upwardly through tubes 38 into the drums 25. The generation of steam in the Stirling boiler is in accordance with the regular operation in such boilers which then passes through the outlets 29 into the superheaters 32 and thence to the steam main.

The modification shown in Fig. 2 is similar to that already described, except that the side walls of the secondary combustion chamber or space 20 are also provided with water tubes. The opposite side walls are provided with water wall tubes 40 and 40' that extend from the headers 13 and 13', respectively, into the corresponding drums 25 along two rows of holes. The front and rear walls of this combustion space 20 are also provided with water wall tubes 41 and 41' that extend from the headers 13 and 13' into the two rows of holes in the upper headers 42 that are connected to the drum 25 by the connections 43. In this modification, the tubes 38 shown in Fig. 1, are omitted as the water wall tubes 40 and 40', 41 and 41' convey the mixture of steam and water from the upper headers 13 and 13' to the drums 25. The mixture, of course, receives additional heat while passing through these tubes.

The manner in which the fuel burners are installed along the sides of the waterwall tubes is indicated in Figs. 3 to 6. Alternate tubes are cut off, as shown at 45, below where the burners are located and the ends thereof are closed and an opening is provided therefrom into the sides of the adjacent tubes, as indicated at 46. The tubes are cut off in a similar way above the burners 11, as shown at 47, and the ends are closed and connections are made to the sides of adjacent tubes, as indicated at 48. For the installation of the burners of the type shown in this illustration, three tubes are cut away, leaving three spaces with two continuous tubes that may be bent outwardly, as shown at 49 (Figs. 4 and 6). Blocks of tile 50 are installed on opposite sides of the pair of bent portions 49, so as to leave spaces between the tile staggered with respect to each other on opposite sides of the pair of tubes.

The elongated narrow mouth 51 of the burner 11 for powdered fuel extends into the space between the bent portions 49, and ports 52 for gas are provided on opposite sides of the mouth portion 51 that have openings 53 leading into the space between the bent portions 49 of the tubes, and conduit or gas pipe 54 leads into the ports 52.

A casing 55 is provided so as to surround the ports 52 and the portion of the burner 11 that is next to the wall, and an air conduit 56 leads to this casing so that the air can enter the furnace between the blocks of tile 50. Powdered fuel is introduced through the elongated mouth 51 and may be supplemented by gaseous fuel that is introduced through the ports 52 and openings 53. The air for combustion purposes enters the casing 55 through the air inlet 56, the passes into the combustion chamber on opposite sides of the bent portions 49 of the tubes between the tile 50. The spaces between the tile 50, through which the air enters, are staggered and the streams of air entering impinge against the sides of the streams of entering fuel so that the air and fuel become well mixed as they enter the furnace. The particular fuel burner construction illustrated and described in this application in conjunction with my improved furnace wall construction is not per se my invention.

I claim:

1. In a boiler, a primary combustion chamber, wall cooling tubes for said chamber and fuel burners, some of said tubes being cut away and others bent outwardly to accommodate said burners, said cut away tubes being connected to said bent tubes.

2. In a boiler, a primary combustion chamber, wall cooling tubes for said chamber and fuel burners, alternate tubes being cut away and joined directly to other tubes to provide spaces for a fuel burner and air inlet ports on the sides of said burner.

3. In a furnace, walls having tubes therein and divided into sections, headers located near the division line between sections, some of the tubes of each section being connected to one of said headers, and other tubes of each section being connected to another one of said headers.

4. In a furnace, walls having closely spaced tubes therein and divided into sections, headers located near the division line between sections, some of the tubes of each section being connected to one of said headers, and other tubes of each section being connected to another one of said headers.

5. In a furnace chamber, portions of a wall for said chamber comprising closely spaced tubes and two headers near the junction of said portions, some of the tubes in each wall portion being connected to one of said headers and other tubes in each wall portion being connected to the other header.

6. In a furnace chamber, portions of a wall for said chamber comprising closely spaced tubes and two headers near the junction of said portions, alternate tubes in each portion being connected to one of said headers and the other tubes to the other header.

7. In a furnace chamber, portions of a wall for said chamber comprising closely spaced tubes and two headers near the junction of said portions, alternate tubes in each portion being connected to one of said headers and the other tubes to the other header, some of said tubes extending upwardly and some of them extending downwardly from said headers.

HOWARD J. KERR.